(12) United States Patent
Iurlaro et al.

(10) Patent No.: US 12,345,171 B2
(45) Date of Patent: Jul. 1, 2025

(54) PROTECTIVE COATINGS FOR AIRCRAFT ENGINE COMPONENTS

(71) Applicant: GE Avio S.r.l., Rivalta di Torino (IT)

(72) Inventors: Simone Iurlaro, Turin (IT); Alessio Gargioli, Turin (IT); Marco Garabello, Turin (IT); Salvatore Garofalo, Turin (IT); Enrica Gilardi, Turin (IT); Ottavia Pica, Orbassano (IT); Giuseppe Argentieri, Turin (IT)

(73) Assignee: GE Avio S.r.l., Rivalta di Torino (IT)

( * ) Notice: Subject to any disclaimer, the term of this patent is extended or adjusted under 35 U.S.C. 154(b) by 540 days.

(21) Appl. No.: 17/565,592

(22) Filed: Dec. 30, 2021

(65) Prior Publication Data

US 2023/0121607 A1 Apr. 20, 2023

(30) Foreign Application Priority Data

Sep. 29, 2021 (IT) .......................... 102021000024893

(51) Int. Cl.
| | | |
|---|---|---|
| *F01D 5/28* | (2006.01) | |
| *B05D 7/00* | (2006.01) | |
| *F01D 25/24* | (2006.01) | |

(52) U.S. Cl.
CPC ........... *F01D 25/24* (2013.01); *B05D 7/5883* (2013.01); *F01D 5/288* (2013.01)

(58) Field of Classification Search
CPC .......... F01D 25/14; F01D 25/24; F01D 5/288; F05D 2230/90; F05D 2300/437; F05D 2300/611; C08L 83/04; C09K 21/00
See application file for complete search history.

(56) References Cited

U.S. PATENT DOCUMENTS

| 3,623,904 A | 11/1971 | Ramseyer |
| 3,983,082 A | 9/1976 | Pratt et al. |

(Continued)

FOREIGN PATENT DOCUMENTS

| CN | 105647380 A | 6/2016 |
| CN | 109593464 A | 4/2019 |

(Continued)

OTHER PUBLICATIONS

Wikipedia—Silanization; https://web.archive.org/web/20210517134627/https://en.wikipedia.org/wiki/Silanization; retreived on Jul. 11, 2024 (Year: 2021).*

(Continued)

*Primary Examiner* — Brian P Wolcott
(74) *Attorney, Agent, or Firm* — Dority & Manning, P.A.

(57) ABSTRACT

An aircraft engine component (100) may include a wall (200) comprising an aluminum alloy and/or a magnesium alloy, and a protective coating (108) covering the wall (200). The protective coating (108) may include a prime layer (206), a silicone elastomer layer (208), and an abrasion resistant layer (210). The prime layer (206) may at least partially cover a surface (202) of the wall (200). The prime layer (206) may include a silane coupling agent and an organic titanate. The silicone elastomer layer (208) may at least partially cover the prime layer (206). The silicone elastomer layer (208) may include one or more filler materials dispersed in a matrix of cross-linked silicone polymers. The abrasion resistant layer (210) may at least partially cover the silicone elastomer layer (208). The abrasion resistant layer (210) may include a fiber-reinforced elastomeric material.

18 Claims, 2 Drawing Sheets

(56) References Cited

U.S. PATENT DOCUMENTS

| | | | |
|---|---|---|---|
| 4,273,879 | A | 6/1981 | Langer et al. |
| 4,588,523 | A | 5/1986 | Tashlick et al. |
| 4,654,236 | A | 3/1987 | Finzel |
| 4,686,244 | A | 8/1987 | Dietlein et al. |
| 4,719,249 | A | 1/1988 | Dietlein et al. |
| 4,816,288 | A | 3/1989 | Rukavina et al. |
| 5,132,054 | A | 7/1992 | Stahl |
| 5,723,515 | A | 3/1998 | Gottfried |
| 8,557,942 | B2 | 10/2013 | Pouchelon et al. |
| 10,487,745 | B2 | 11/2019 | Kubisch et al. |
| 11,530,362 | B2 * | 12/2022 | Huff ............... C10M 139/04 |
| 2003/0003306 | A1 | 1/2003 | Wong et al. |
| 2003/0049413 | A1 | 3/2003 | Packer et al. |
| 2005/0271881 | A1 | 12/2005 | Hong |
| 2006/0281861 | A1 | 12/2006 | Putnam |
| 2013/0293835 | A1 | 11/2013 | Saint-Lu et al. |
| 2016/0006232 | A1 | 1/2016 | Soulignac et al. |
| 2017/0192374 | A1 | 7/2017 | Landa et al. |

FOREIGN PATENT DOCUMENTS

| | | |
|---|---|---|
| CN | 111019503 A | 4/2020 |
| CN | 112011254 A | 12/2020 |
| EP | 3366729 B1 | 11/2019 |
| JP | 2017159484 A | 9/2017 |

OTHER PUBLICATIONS

Wikipedia—Silanization (Year: 2021).*

Borica, Tytan Titanates, Making A World if Difference to Coatings, 2014, 24 Pages. https://dar-techine.com/wp-content/uploads/2014/02/Borica-Tytan-Coatings-Brochure.pdf Carboline, A/D Firefilm III Product Data Sheet, Selection & Specification Data, 35AD, Mar. 2021, 5 Pages.

Chapline et al., Thermal Protection Systems, NASA Engineering Innovations, pp. 182-199. https://www.nasa.gov/centers/johnson/pdf/584728main_Wings-ch4b-pgs182-199.pdf.

Chartek 7E, International, 4 Pages. https://international.brand.akzonobel.com/m/55229e3312bf32d6/original/Chartek_7E_eng_A4_20171218.pdf.

DOW Corning, PR-1200 RTV Prime Coat, Ref. No. 11-1766-01, Product Information Primers, Jan. 20, 2010, 2 Pages.

DOW, DOWSIL PR-1200 RTV Prime Coat Red, Safety Data Sheet, 19 Pages.

DOW, DOWSIL PR-1200 RTV Prime Coat, Safety Data Sheet, Jul. 2019, 14 Pages.

DOW, DOWSIL PR-1200 RTV Prime Coat, Technical Data Sheet, 2017, 3 Pages.

Dreggors, Alternative Foam Treatments for the Space Shuttle's External Tank, University of Florida Electronic Theses and Dissertations 2004-2019, 2005, 73 Pages.

Morrissey, New Materials for Aging Space Shuttle, c&en, Materials, vol. 83, Issue 44, Oct. 31, 2005, 7 Pages. https://cen.acs.org/articles/83/i44/New-Materials-Aging-Space-Shuttle.html.

NASA, In-Flight Inspection and Repair, Return to Flight, 9 Pages.

Special Chem, Adhesion Promoters: Adhesion Basics & Material Selection Tips for Adhesives, 17 Pages. https://adhesive.specialchem.com/selection-guide/adhesives-sealants.

TPP Thermal Protection Products, MA-25S Ablative Material, MI-15 Ablative Material, MI-15 Topcoat, SLA-220, Lockheed Martin, 8 Pages. https://www.lockheedmartin.com/en-us/products/thermalprotection.html.

Tyzor TnBT Organic Titanate, Dorf Ketal Speciality Catalysts, LLC, Jul. 14, 2010, 2 Pages.

* cited by examiner

PROTECTIVE COATINGS FOR AIRCRAFT ENGINE COMPONENTS

CROSS-REFERENCE TO RELATED APPLICATION

This application claims priority to Italian application number 102021000024893, filed Sep. 29, 2021.

FIELD

The present disclosure generally pertains to protective coatings for aircraft engine components, methods of applying protective coatings, and aircraft engine components that include a protective coating.

BACKGROUND

Aircraft engine components such as gearboxes, oil tanks, and the like may utilize various forms of protection to mitigate various sources of potential heat, corrosion, fretting, handling, and the like. It is desirable to protect such aircraft engine components, for example, to prolong operating life. Accordingly, there exists a need for improved protective coatings for aircraft engine components, as well as improved methods for applying protective coatings, and aircraft engine components that include an improved protective coating.

BRIEF DESCRIPTION OF THE DRAWINGS

A full and enabling disclosure, including the best mode thereof, directed to one of ordinary skill in the art, is set forth in the specification, which makes reference to the appended Figures, in which.

Figure 2:
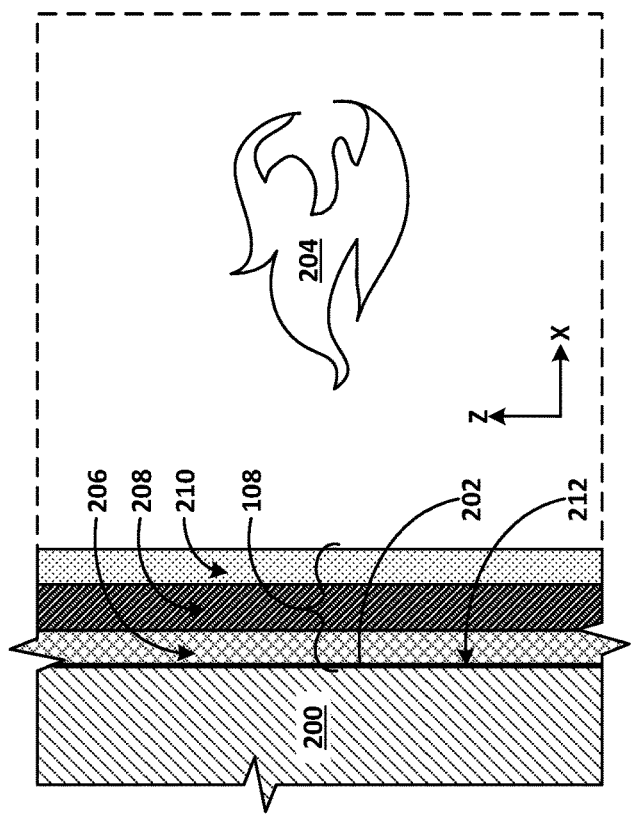
FIG. 2 schematically depicts a cross-sectional view of a wall of the aircraft engine component of FIG. 1, with an exemplary protective coating applied to the wall of the aircraft engine component.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

It is understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure generally pertains to protective coatings for aircraft engine components, as well as methods of applying protective coatings, and aircraft engine components that include a protective coating. The presently disclosed protective coatings may provide protection from a variety of sources of heat, fire, corrosion, fretting, handling, and the like. Exemplary protective coatings may exhibit good thermal properties in the presence of heat and/or fire, while also exhibiting good surface toughness and resistance to corrosive materials. The thermal properties of exemplary protective coatings may include good insulative properties and/or good ablative properties. Good insulative properties may include a low thermal conductivity. Good ablative properties may include a high ablation temperature, a high heat of ablation, and/or a high continuous use temperature.

A protective coating may provide thermal protection by way of insulation, for example, when the protective coating is at a temperature below an ablation temperature. Additionally, or in the alternative, a protective coating may provide thermal protection by way of ablation, for example, when the protective coating exceeds the ablation temperature. As used herein, the term "ablation" or "ablative properties" refers to thermal protection based on physicochemical transformations of a solid material when exposed to sufficiently high convective or radiant heat. Thermal protection by ablation of a protective coating may be quantified at least in part by the heat of phase and chemical transformation of the protective coating and/or the reduction in heat flow attributable to one or more of pyrolysis, charring, melting, subliming, vaporizing, spalling, swelling, and the like. In some embodiments, a protective coating that provides thermal protection by ablation may include an intumescent material. As used herein, an "intumescent material" refers to a material that swells as a result of heat exposure, leading to an increase in volume and a decrease in density. An intumescent material may produce char, such as light char, or hard char. Such char may exhibit relatively low heat conductivity. As used herein, "intumescent properties" refers to swelling and/or the production of char as a result of heat exposure.

In some embodiments, a protective coating that exhibits ablative properties and/or intumescent material may undergo a chemical reaction when heated to form an expanded, thermally insulating layer. Additionally, or in the alternative, when exposed to heat, one or more components in the protective coating may form a char or melt, which may expand to form a porous or sponge-like layer that provides a physical protection and a thermal insulation of a base material from further heat exposure.

In addition to good thermal properties, exemplary protective coatings may have a combination of surface toughness and bulk softness that allows the protective coating to provide good protection from wear and tear. Further, exemplary protective coatings may provide protection from corrosion, for example, in the event of exposure to corrosive materials such as oil, fuel, hydraulic fluid, alkaline fluids, cleaning fluids, solvents, or salt water, as well as other fluids commonly associated with operation of aircraft, aircraft engines, and related systems.

These and other advantages of the presently disclosed protective coatings may be realized by a combination of layers that provide a synergistic effect. Exemplary protective coatings may include a silane coupling agent and an organic titanate that together provide for improved bonding between the surface of an aircraft component and silicone polymers that make up a majority of the thickness of the protective coating. The silane coupling agent and the organic titanate may be dispersed in an organic solvent that leaves little to no residue. Exemplary protective coatings may include a silicone elastomer layer formed from a silicone polymer formulation that includes one or more silicone polymers and one or more filler materials. When cured, the one or more silicone polymers and one or more filler materials may form a silicone elastomer layer that includes the one or more filler materials dispersed in a matrix of cross-linked silicone polymers. Additionally, the one or more silicone polymers may bond with the silane coupling agent and/or the organic titanate in the prime layer. In some embodiments, the silicone polymer formulation may include a silanization agent that may enhance bonding between silicone polymers in the silicone polymer formulation and the silane coupling agent and/or the organic titanate in the prime layer. Additionally, or in the alternative, the silanization agent may enhance bonding within the silicone polymer formulation, including bonding between filler materials and silicone polymers. An inward portion of the protective coating may have a low to medium density, and a soft to medium-soft Shore A hardness, while an outward portion of the protective coating may have a medium to high density with a somewhat higher Shore A hardness, thereby providing a combination of good resistance to abrasions as well as impacts, and the like.

These and other properties are realized at least in part by the composition of the respective parts of the presently disclosed protective coatings. For example, by formulating a protective coating in accordance with the present disclosure, much thicker protective coatings may be applied to aircraft components, while maintaining good bonding to the surface of the aircraft component as well as within the protective coating itself. The combination of good bonds at the surface and within the protective coating provides for good resilience, while mitigating the possibility for cracks, chips, or delamination, and the like to effect the longevity of the protective coating. For example, the presently disclosed protective coatings may have a thickness of several millimeters, such as up to 10 millimeters or more. Such an enhanced thickness may provide for improved protection from heat sources, including improved insulative properties and/or ablative properties, as well as improved protection from wear and tear, corrosive materials, and the like. Advantageously, the presently disclosed protective coatings preferably include silicone polymers and filler materials that, when cured, provide a protective coating that substantially retains its size and shape when exposed to heat and/or flames, for example, substantially without exhibiting thermal expansion when below a threshold temperature for continuous use. For example, in some embodiments, the presently disclosed protective coatings may withstand sustained continuous operating temperatures of up to 315° C., or more. In some embodiments, a protective coating may be formulated to exhibit intumescent properties, if desired.

The presently disclosed protective coatings are generally intended to be applied to the surface of aircraft engine components. It will be appreciated, however, that aircraft engine components are merely one example use of the presently disclosed protective coatings, and that the protective coatings may additionally or alternatively be applied to any component that may benefit from protection against exposure to heat sources, wear and tear, and/or corrosive fluids or other materials. For example, the presently disclosed protective coatings may be applied to any kind of engine, any kind of aircraft component, any kind of industrial equipment, and so forth.

Figure 1:
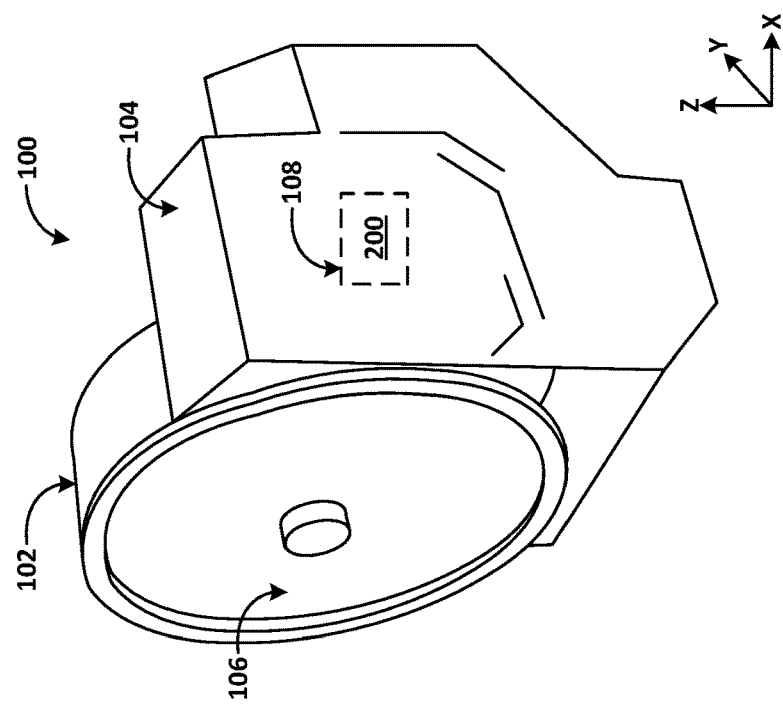
FIG. 1 schematically depicts a perspective view of an exemplary aircraft engine component.

Referring now to FIG. 1, an exemplary component 100 may include a gearbox 102 and/or an oil tank 104. The gearbox 102 may be configured as a power gearbox configured to transfer power from a turbomachine to a fan or propeller assembly (not shown). For example, the gearbox 102 may include an epicyclic gear assembly 106 configured to couple the fan or propeller assembly to the turbomachine. Alternatively, the gearbox 102 may be configured as an accessory gearbox configured to transfer power from a turbomachine to one or more accessory systems of an aircraft engine or other aircraft systems.

A protective coating 108 may cover all or a portion of a wall 200 of the component 100 such as the gearbox 102 and/or the oil tank 104 as shown in FIG. 1. It will be appreciated that the gearbox 102 and the oil tank 104 shown in FIG. 1 are provided by way of example and not to be limiting. Further examples of aircraft engine components that may receive the protective coating 108 include turbomachine casings, combustion chambers, exhaust ducts, bypass ducts, heat exchangers, fuel systems, oil systems, firewalls, and so forth. In fact, the presently disclosed protective coatings 108 may be suitable for any aircraft engine component that may be exposed to sources of heat, fire, corrosion, fretting, handling, and the like.

Referring to FIG. 2, the protective coating 108 may be applied to the wall 200 of the component 100. The protective coating 108 may be applied to all or a portion of a surface 202 of the wall 200, such as the surface 202 that may be exposed to a heat source 204. The surface 202 may be an external surface or an internal surface. The heat source 204 may include an extant heat source such as a flame from a burner or fumes from an exhaust duct. Additionally, or in the alternative, the heat source 204 may include a potential heat source, such as an area that may be exposed to flame, sparks, slag, embers, fumes, hot gasses, combustion residues, and the like in the event of an emergency or malfunction.

The presently disclosed protective coatings 108 are suitable for use with aircraft engine components 100 formed of metal alloys, such as aluminum alloys, magnesium alloys, and alloys that include a combination of aluminum and magnesium. The protective coatings 108 may be suitable, for example, for use with components 100 that are formed by any manufacturing process, including casting, forging, machining, additive manufacturing, subtractive manufacturing, and so forth. By way of example, the protective coating 108 may be applied to aluminum alloys that include chromium, copper, iron, magnesium, manganese, titanium, scandium, silicon, or zinc, as well as combinations of these. An exemplary aluminum alloy may have a composition that includes aluminum, silicon, copper, and magnesium. The aluminum alloy may be formed, for example, according to ASM4215. As a further example, the protective coating 108 may be applied to magnesium alloys that include aluminum, copper, manganese, one or more rare earth elements, silicon, zinc, or zirconium, as well as combinations of these. An exemplary magnesium alloy may have a composition that includes magnesium, zinc, rare earth, and zirconium. The magnesium alloy may be formed, for example, according to ASM4439. The presently disclosed protective coatings 108 may also be suitable for use with various other materials, including steel alloys, nickel-chromium alloys, carbon fiber, ceramics, plastics, and so forth.

As shown in FIG. 2, and as will be discussed in more detail herein, the protective coating 108 may generally include a prime layer 206 at least partially covering the surface 202 of the wall 200 of the component 100, a silicone elastomer layer 208 at least partially covering the prime layer 206, and an abrasion resistant layer 210 at least partially covering the silicone elastomer layer 208. The prime layer 206 may include a silane coupling agent and an organic titanate. The silicone elastomer layer 208 may include one or more filler materials dispersed in a matrix of cross-linked silicone polymers. The abrasion resistant layer 210 may include one or more fibrous reinforcing materials dispersed in a matrix of cross-linked silicone polymers. In some embodiments, the surface 202 of the wall 200 of the component 100 may receive a surface treatment 212 in preparation for the protective coating 108. The surface treatment 212 may be included as a base layer of the protective coating 108, and/or the surface treatment 212 may define as a property of the surface 202 of the wall 200 of the component 100 to which the protective coating 108 may be applied.

In some embodiments, the surface treatment 212 may include a chemical conversion coating, such as a chromate conversion coating. Additionally, or in the alternative, the surface treatment 212 may include an anodizing coating. The surface treatment 212 may provide improved adhesion between the surface 202 of the wall 200 and the prime layer 206. A chemical conversion coating may be applied by immersing the component 100 in a chemical bath that contains suitable metal ions, such as chromium ions. An anodizing coating may be applied by immersing the component 100 in an electrolytic bath that contains a suitable acid, such as chromic acid, sulfuric acid, phosphoric acid, and so forth, while passing an electric current through the bath. A chromate conversion coating and/or an anodizing coating may be particularly suitable for components 100 formed of aluminum and/or magnesium alloys.

The prime layer 206 may be applied over all or a portion of the surface 202 of the wall 200 of the component 100. In some embodiments, the prime layer 206 may be applied over the surface 202 that has received the surface treatment 212. The prime layer 206 may include a silane coupling agent and/or an organic titanate. The silane coupling agent may be selected to provide a durable bond between the surface 202 or surface treatment 212 of the component 100 and the silicone elastomer layer 208 to be applied over the prime layer 206. The silane coupling agent may include hydrolyzable functional groups, such as acyloxy groups, alkoxy groups, amine groups, butyl groups, ethoxy groups, ethyl groups, halogen groups, or phenyl groups, as well as combinations of these. The hydrolyzable functional groups may form stable condensation products with oxides of aluminum and/or oxides of magnesium, as well as other metal oxides. Following hydrolysis, the silane coupling agent may include silanol groups that may react with the silicone polymers to form siloxane bonds during the curing process of the formulation used to form the silicone elastomer layer 208. These siloxane bonds may be particularly stable and thereby promote good adhesion between the prime layer 206 and the silicone elastomer layer 208. Exemplary silane coupling agents may include trialkoxysilane, monoalkoxysilane, or dipodal silane. Further exemplary silane coupling agents may include a silicic acid ester, such as tetramethoxysilane, methyl silicate, tetraethyoxysilane, ethyl polysilicate, tetrapropoxysilane, tetraisopropoxysilane, tetrabutoxysilane, or tetrakis(butoxyethoxy)silane, as well as combinations of these.

The organic titanate may similarly be selected to provide a durable bond between the surface 202 or surface treatment 212 of the component 100 and the silicone elastomer layer 208 to be applied over the prime layer 206. The organic titanate may include hydrolysable functional groups that react with oxides of aluminum and/or oxides of magnesium, as well as other metal oxides. In some embodiments, hydrolysis of the organic titanate may form a monomolecular layer on the surface 202 or surface treatment 212 of the component 100, for example, without yielding a condensation product. Additionally, or in the alternative, the organic titanate may include thermosetting functional groups that may form bonds with hydrocarbon chains of the silicone polymers, and/or the organic titanate may include hydrocarbon chains that may bond with the silicone polymers by way of Van der Waals forces. Exemplary thermosetting functional groups of the organic titanate may include acrylate groups, alkyl groups, amine groups, carboxylic acid groups, epoxy groups, hydroxy groups, mercaptan groups, or vinyl groups, as well as combinations of these. Additionally, or in the alternative, in some embodiments, the organic titanate may hydrolyze to yield titanium oxides such as titanium dioxide that may catalyze or react with silicone polymers in the formulation used to form the silicone elastomer layer 208. For example, an organic titanate may include a titanium dioxide content of from about 15 mol. % to about 30 mol. %, such as from about 20 mol. % to about 25 mol. %. Exemplary organic titanates may include ethyl acetoacetate titanate, di-iso-butoxy titanium, di-n-butoxy titanium, di-iso-propoxy titanium, n-Butyl polytitanate, tetra n-Butyl titanate, titanium tetrabutanolate, titanium butoxide, titanium ethylacetoacetate, or titanium tetraisopropoxide, as well as combinations of these.

The prime layer 206 may be provided in a solution that includes the silane coupling agent, the organic titanate, and an organic solvent such as an aliphatic solvent. In an exemplary embodiment, the organic solvent may include naphtha. The organic solvent, such as naphtha may be selected to leave little to no residue. The substantial absence of residues from the prime layer promotes good functionality of the silane coupling agent and the organic titanate, for example, with respect to cross-linking reactions with silicone polymers in the silicone elastomer layer 208. The solution may include an organic solvent in an amount of from about 75 wt. % to about 95 wt. %, such as from about 77 wt. % to about 94 wt. %, or such as from about 80 wt. % to about 85 wt. %. The silane coupling agent may be included in the solution in an amount of from about 2 wt. % to about 10 wt. %, such as from about 4 wt. % to about 6 wt.

%. The organic titanate may be included in the solution in an amount of from about 2 wt. % to about 10 wt. %, such as from about 4 wt. % to about 6 wt. %. By way of example, an exemplary solution that may be utilized to apply the prime layer 206 may include from about 75 wt. % to about 95 wt. %, such as from about 82 wt. % to about 88 wt. % light aliphatic naphtha; from about 4 wt. % to about 6 wt. % tetrakis(2-butoxyethyl) orthosilicate; and from about 4 wt. % to about 6 wt. % tetra n-Butyl titanate. Such a solution is commercially available as DOWSIL™ PR-1200, Dow Chemical Company, Midland, MI.

After the organic solvent has at least partially evaporated, preferably fully evaporated, the prime layer 206 may include a silane coupling agent in an amount of from about 15 wt. % to about 85 wt. %, such as from about 15 wt. % to about 40 wt. %, such as from about 40 wt. % to about 60 wt. %, or such as from about 60 wt. % to about 85 wt. %. Additionally, or in the alternative, after the organic solvent has at least evaporated, preferably fully evaporated, the prime layer 206 may include an organic titanate in an amount of about 15 wt. % to about 85 wt. %, such as from about 15 wt. % to about 40 wt. %, such as from about 40 wt. % to about 60 wt. %, or such as from about 60 wt. % to about 85 wt. %.

The silicone elastomer layer 208 may be applied over at least a portion of the prime layer 206. The silicone elastomer layer 208 may be provided by way of one or more silicone polymer formulations that can be applied to the prime layer 206 using standard spray equipment and/or using standard trowel/molding equipment. When cured, the one or more silicone polymer formulations may include one or more filler materials dispersed in a matrix of cross-linked silicone polymers. The presently disclosed silicone polymer formulations may be utilized to form the silicone elastomer layer 208 that has good insulation properties and/or good ablation properties in the presence of the heat source 204. The silicone elastomer layer 208 may also exhibit good elastomeric properties that, for example, may provide protection from wear and tear from bumps, nicks, dings, and the like that may arise in the course of installation, maintenance, handling, and operation. Exemplary silicone polymer formulations may include one or more silicone polymers and one or more filler materials. The one or more silicone polymers may be cross-linked or cured, for example, by any suitable cross-linking agent. Additionally, or in the alternative, the one or more silicone polymers may be self-curing in the presence of atmospheric moisture.

Exemplary silicone polymers may include room-temperature-vulcanizing (RTV) silicone, or liquid silicone rubber, as well as combinations of these. Suitable RTV silicones may be cured in the presence of atmospheric moisture, such as in the case of one-component silicone formulations, which may sometimes be referred to as "RTV 1 silicone." Additionally, or in the alternative, suitable RTV silicones may be cured in the presence of a catalyst, such as in the case of two-component silicone formulations, which may sometimes be referred to as "RTV 2 silicone." The curing process of such RTV silicones may be accelerated by heat or pressure. A silicone polymer may be derived from one or more polyorganosiloxanes, such as polydimethylsiloxane, polymethylhydrogensiloxane, dimethyidiphenylpolysiloxane, dimethyl/methylphenylpolysiloxane, polymethylphenylsiloxane, methylphenyl/dimethylsiloxane, vinyldimethyl terminated polydimethylsiloxane, vinylmethyl/dimethylpolysiloxane, vinyldimethyl terminated vinylmethyl/dimethylpolysiloxane, divinylmethyl terminated polydimethylsiloxane, vinylphenylmethyl terminated polydimethylsiloxane, dimethylhydro terminated polydimethylsiloxane, methylhydro/dimethylpolysiloxane, methylhydro terminated methyloctylpolysiloxane, methylhydro/phenylmethyl polysiloxane, oligosiloxanes, or fluoro-modified polysiloxanes, as well as combinations of these. To form a silicone elastomer, the one or more polyorganosiloxanes may be crosslinked using any suitable technique, such as catalyst curing, heat curing, or the like. Any suitable crosslinking agent may be utilized, such as alkoxy silanes that include one or more cross-linking functional groups such as alkyl groups, alkenyl groups, carboxyalkyl groups, as well as combinations of these. Any suitable catalyst may be used, such as a platinum catalyst, a peroxide catalyst, or a tin catalyst. It will be appreciated that the aforementioned silicone polymer components are provided by way of example and not to be limiting, and that the silicone elastomer layer 208 may include other types of silicone polymers, and/or that the silicone elastomer layer 208 may include other components, without departing from the scope of the present disclosure.

The silicone elastomer layer 208 may include one or more filler materials dispersed in a matrix of cross-linked silicone polymers. Exemplary filler materials that may be included in a silicone polymer formulation that may be used to form the silicone elastomer layer 208 include glass microspheres (hollow or solid), glass fibers, cenospheres, fumed silica, precipitated silica, silica fibers, silicon dioxide, silicon carbide, titanium dioxide, zinc oxide, rare earth minerals, silicate minerals, inosilicates, aluminum silicate, alumina trihydrate, polyepoxide microparticles, phenolic resin microspheres (hollow or solid), ceramics, carbon fibers, carbon black, graphene, cellulosic fibers, or cork, as well as combinations of these. Exemplary filler materials may have an average cross-sectional width of from about 10 nanometers (nm) to about 1,000 micrometers (μm), such as from about 10 nm to about 1,000 nm, such as from about 100 nm to about 500 nm, such as from about 1 μm to about 1,000 μm, such as from about 10 μm to about 500 μm, or such as from about 100 μm to about 1,000 μm. It will be appreciated that the aforementioned filler materials are provided by way of example and not to be limiting, and that the silicone elastomer layer 208 may include other types of filler materials without departing from the scope of the present disclosure.

The particular filler material(s) and amount thereof in a silicone polymer formulation may be selected to realize desired material properties of the resulting silicone elastomer layer 208. An exemplary silicone elastomer layer 208 may include one or more fillers in an amount, individually or collectively, of from about 0.1 vol. % to about 90 vol. %, such as from about 1 vol. % to about 80 vol. %, such as from about 5 vol. % to about 60 vol. % such as from about 10 vol. % to about 60 vol. %, such as from about 20 vol. % to about 50 vol. %, such as from about 30 vol. % to about 40 vol. %, or such as from about 60 vol. % to about 90 vol. %. The total filler content of the silicone elastomer layer 208 may be at least about 1 vol. %, such as at least about 5 vol. %, such as at least about 10 vol. %, such as at least about 20 vol. %, such as at least about 30 vol. %, such as at least about 40 vol. %, such as at least about 50 vol. %, such as at least about 60 Vol. %, such as at least about 70 Vol. %, or such as at least about 80 vol. %.

In some embodiments, the silicone elastomer layer 208 may include a silanization agent, such as an aminosilane, a glycidoxysilane, or a mercaptosilane, as well as combinations of these. The silanization agent may form siloxane bonds between one or more materials in the silicone polymer formulation used to form the silicone elastomer layer 208 and one or more components of the prime layer 206. For example, a silanization agent may form siloxane bonds between organic titanate of the prime layer 206 and a silicone polymer in the formulation used to form the silicone elastomer layer 208. Additionally, or in the alternative, a silanization agent may form siloxane bonds between the organic titanate of the prime layer 206 and one or more filler materials in the formulation used to form the silicone elastomer layer 208, and/or between the silicone polymer and the one or more filler materials in the formulation used to form the silicone elastomer layer 208. Suitable aminosilanes may include (3-aminopropyl)triethoxysilane, (3-aminopropyl)-diethoxy-methylsilane, (3-aminopropyl)-dimethyl-ethoxysilane, (3-aminopropyl)-trimethoxysilane. An exemplary glycidoxysilane may include (3-glycidoxypropyl)-dimethyl-ethoxysilane. Exemplary mercaptosilanes include (3-mercaptopropyl)-trimethoxysilane and (3-mercaptopropyl)-methyl-dimethoxysilane.

In some embodiments, the silicone elastomer layer 208 may include an intumescent material. An intumescent material may include a material that produces char when exposed to heat. For example, a silicone polymer formulation may include an intumescent material. In some embodiments, a silicone polymer may exhibit intumescent properties. Additionally, or in the alternative, the silicone elastomer layer 208 may include one or more intumescent materials that are utilized as filler materials. For example, the one or more intumescent materials may be dispersed in a matrix of cross-linked silicone polymers. Further exemplary intumescent materials that may be included in the silicone elastomer layer 208 include vinyl acetates, styrene acrylates, as well as combinations of these. An exemplary intumescent material may include a soft char formulation. The soft char formulation may include ammonium polyphosphate, pentaerythritol, or melamine, as well as combinations of these. The soft char formulation may produce light char when exposed to heat. Additionally, or in the alternative, an exemplary intumescent material may include a hard char formulation. The hard char formulation may include one or more sodium silicates, one or more ammonium phosphates, or graphite, as well as combinations of these. The hard char formulation may produce hard char when exposed to heat. One or more intumescent materials, such as one or more components in a soft char formulation and/or one or more components in a hard char formulation, may be dispersed in a matrix, such as a matrix of cross-linked silicone polymers, acetate copolymers, or styrene acrylate polymers, as well as combinations of these. The intumescent material may form a microporous carbonaceous foam, for example, as a result of a chemical reaction of one or more components in the intumescent material.

When cured, the silicone elastomer layer 208 may have good thermal properties to withstand exposure to the heat source 204, including good insulative properties and/or good ablative properties. For example, when cured, the silicone elastomer layer 208 may have a thermal conductivity at 38° C. of from about 0.05 W/mK to about 0.15 W/mK, such as from about 0.07 W/mK to about 0.12 W/mK, or such as from about 0.08 W/mK to about 0.11 W/mK, as measured, for example, according to ASTM C177. Additionally, or in the alternative, the silicone elastomer layer 208 may have a specific heat at 24° C. of from about 1.0 kJ/kg-K to about 1.6 kJ/kg-K, such as from about 1.2 kJ/kg-K to about 1.6 kJ/kg-K, or such as from about 1.2 kJ/kg-K to about 1.4 kJ/kg-K, as measured, for example, according to ASTM E1269-11 (2018). Additionally, or in the alternative, the silicone elastomer layer 208 may have an ablation temperature of from about 450° C. to about 600° C., such as from about 475° C. to about 550° C., or such as from about 500° C. to about 525 C, as measured, for example, according to ASTM E285-80 (2002). Additionally, or in the alternative, the silicone elastomer layer 208 may have a heat of ablation of from about 40 megajoules per kilogram (MJ/kg) to about 70 MJ/kg, or such as from about 50 MJ/kg to about 60 MJ/kg, with a heat exposure of 330 kilojoules per square meter per second (kJ/m$^2$-sec), as measured, for example, according to ASTM E458-08 (2020). Additionally, or in the alternative, an exemplary silicone elastomer layer 208 may have a continuous use temperature of up to at least about 300° C., such as up to at least about 315° C., or such as up to at least about 325° C. Additionally, or in the alternative, an exemplary silicone elastomer layer 208 may exhibit a thermal expansion of from about 0.2% to about 0.01%, such as from about 0.1% to about 0.05%, or such as from about 0.09% to about 0.07%, as measured across an increase in temperature from 3° C. to 34° C.

In addition to good thermal properties, an exemplary silicone elastomer layer 208 may have a low to medium density, and a soft to medium-soft Shore A hardness. For example, an exemplary silicone elastomer layer 208 may have a density of from about 0.2 g/cm$^3$ to about 0.6 g/cm$^3$, such as from about 0.2 g/cm$^3$ to about 0.3 g/cm$^3$, such as from about 0.35 g/cm$^3$ to about 0.45 g/cm$^3$, or such as from about 0.45 g/cm$^3$ to about 0.55 g/cm$^3$. An exemplary silicone elastomer layer 208 may have a Shore A hardness of from about 30 to about 80, such as from about 35 to about 45, such as from about 40 to about 60, or such as from about 60 to about 80, as measured, for example, according to ASTM D2240-15e1.

In some embodiments, an exemplary silicone elastomer layer 208 may include RTV silicone, glass microspheres, silicone oil, fumed silica, and (3-aminopropyl)triethoxysilane. Additionally, or in the alternative, in some embodiments, an exemplary silicone elastomer layer 208 may include one or more silicone polymers in an amount of from about 22 wt. % to about 26 wt. %, silica fibers in an amount of from about 1 wt. % to about 5 wt. %, carbon fibers in an amount of from about 1 wt. % to about 5 wt. %, silica microspheres in an amount of from about 30 wt. % to about 40 wt. %, phenolic resin microspheres in an amount of from about 4 wt. % to about 8 wt. %, and cork in an amount of from about 20 wt. % to about 40 wt. %. Exemplary silicone polymer formulations that may be included in a formulation used to form the silicone elastomer layer 208 are commercially available as MA-25S® Ablative Material and/or MI-15® Ablative Material, from Thermal Protection Products, New Orleans, LA.

After the silicone elastomer layer 208 has at least partially cured, preferably fully cured, an abrasion resistant layer 210 may be applied over at least a portion of the silicone elastomer layer 208. The abrasion resistant layer 210 may be formed using a formulation that can be applied to the silicone elastomer layer 208 using standard spray, brush, or roller equipment. The abrasion resistant layer 210 may exhibit good toughness. For example, the abrasion resistant layer 210 may have a medium to high density, while still having a soft to medium-soft Shore A hardness. This combination of medium to high density with soft to medium-soft Shore A hardness may provide good resistance to fretting and other sources of wear.

The abrasion resistant layer 210 may include a fiber-reinforced elastomeric material. The fiber-reinforced elastomeric material of the abrasion resistant layer 210 may include one or more polymeric materials and one or more fibrous reinforcing materials. The one or more fibrous reinforcing materials may be dispersed in a matrix of cross-linked polymeric material. The polymeric material may be cross-linked or cured, for example, by any suitable cross-linking agent. Exemplary polymeric material that may be included in the formulation used to form the abrasion resistant layer 210 may include one or more silicone polymers, such as those described above with reference to the silicone elastomer layer 208. In addition, or in the alternative to silicone polymers, further exemplary polymeric materials that may be included in the formulation used to form the abrasion resistant layer 210 include thermoplastic materials and/or thermosetting materials. Exemplary thermoplastic materials include acrylics, such as polyacrylic acids, and polymethyl methacrylate; polyamides, polylactic acids; polybenzimidazole; polycarbonates; polyether sulfone; polyoxymethylene; polyether ether ketone; polyetherimide; polyphenylene oxide; polyphenylene sulfide; or polytetrafluoroethylene, as well as combinations of these. In addition to silicone polymers, exemplary thermosetting materials include epoxy resins, polyester resins, polyurethanes, or vinyl ester resins, as well as combinations of these. Any one or more of these thermoplastic materials and/or thermosetting materials may be included in a formulated used to form an abrasion resistant layer 210. Additionally, or in the alternative, any one or more of these thermoplastic materials and/or thermosetting materials may be included in a formulation uses to form the silicone elastomer layer 208.

Exemplary fibrous reinforcing materials that may be included in the formulation used to form the abrasion resistant layer 210 may include glass fibers, basalt fibers, carbon fibers, ceramic fibers, aramid fibers, polycrystalline fibers, or polysiloxane fibers, as well as combinations of these. By way of example, suitable glass fibers may be formulated from silica sand, limestone, kaolin clay, fluorspar, colemanite, dolomite, or alumino-borosilicate, as well as combinations of these. Suitable carbon fibers may be formulated from polyacrylonitrile, rayon, or pitch precursors, as well as combinations of these. Suitable ceramic fibers may be formulated from may be formulated from zirconia, aluminosilicate, polycrystalline alumina, polycrystalline mullite fiber. Ceramic fibers may additionally, or alternatively include ceramic matrix composites, such as silicon carbide polycrystalline fibers. Suitable aramid fibers may include para-aramid fibers, meta-aramid fibers, and/or poly-aramid fibers. Aramid fibers may be formulated from one or more aromatic polyamides, such as para-polyaramide, p-phenylene diamine, or terephthaloyl dichloride. It will be appreciated that the abrasion resistant layer 210 may include other types of reinforcing fibers without departing from the scope of the present disclosure.

Exemplary fibrous reinforcing materials that may be included in the abrasion resistant layer 210 may have an average length (e.g., an as-formed length or a chopped length) of from about 1 micrometers (μm) to about 10,000 μm, such as from about 100 μm to about 500 μm, such as from about 500 μm to about 1,000 μm, such as from about 1,000 μm to about 5,000 μm, or such as from about 1,000 μm to about 10,000 μm. Additionally, or in the alternative, exemplary fibrous reinforcing materials may have an average cross-sectional width of from about 1 μm to about 50 μm, such as from about 1 μm to about 5 μm, such as from about 5 μm to about 10 μm, such as from about 10 μm to about 25 μm, or such as from about 25 μm to about 50 μm.

The particular fibrous reinforcing material(s) and amount thereof in the abrasion resistant layer 210 may be selected to realize desired material properties. An exemplary abrasion resistant layer 210 may include one or more fibrous reinforcing materials in an amount, individually or collectively, of from about 0.1 vol. % to about 60 vol. %, such as from about 1 vol. % to about 60 vol. %, such as from about 5 vol. % to about 60 vol. % such as from about 10 vol. % to about 60 vol. %, such as from about 20 vol. % to about 50 vol. %, or such as from about 30 vol. % to about 40 vol. %. The total fibrous reinforcing material content of the abrasion resistant layer 210 may be at least about 1 vol. %, such as at least about 5 vol. %, such as at least about 10 vol. %, such as at least about 20 vol. %, such as at least about 30 vol. %, such as at least about 40 vol. %, such as at least about 50 vol. %, or such as at least about 60 vol. %.

In addition to fibrous-reinforcing material(s), the abrasion resistant layer 210 may include one or more filler materials, such as one or more of the filler materials described with reference to the silicone elastomer layer 208. Additionally, or in the alternative, the silicone elastomer layer 208 may include one or more fibrous-reinforcing materials in addition to filler material(s), such as one or more of the fibrous-reinforcing materials described with reference to the abrasion resistant layer 210. Additionally, or in the alternative, in some embodiments, the abrasion resistant layer 210 may include an intumescent material, such as one or more of the intumescent materials described with reference to the silicone elastomer layer 208.

When cured, the exemplary abrasion resistant layer 210 may have a density of from about 0.9 g/cm$^3$ to about 1.4 g/cm$^3$, such as from about 1.0 g/cm$^3$ to about 1.3 g/cm$^3$, or such as from about 1.1 g/cm$^3$ to about 1.2 g/cm$^3$. An exemplary fiber-reinforced elastomer formulation may have a Shore A hardness, when cured, of from about 40 to about 90, such as from about 50 to about 60, such as from about 60 to about 80, or such as from about 80 to about 90, as measured, for example, according to ASTM D2240-15e1.

In addition to a combination of medium to high density with soft to medium-soft Shore A hardness, an exemplary fiber-reinforced elastomer formulation may have good thermal properties to withstand exposure to the heat source 204, including good insulative properties and/or good ablative properties. For example, when cured, an exemplary fiber-reinforced elastomer formulation may have a thermal conductivity at 38° C. of from about 0.10 W/mK to about 0.25 W/mK, such as from about 0.15 W/mK to about 0.25 W/mK, or such as from about 0.20 W/mK to about 0.25 W/mK, as measured, for example, according to ASTM C177. Additionally, or in the alternative, an exemplary fiber-reinforced elastomer formulation may have a specific heat at 38° C. of from about 0.9 kJ/kg-K to about 1.5 kJ/kg-K, such as from about 1.0 kJ/kg-K to about 1.1 kJ/kg-K, or such as from about 1.2 kJ/kg-K to about 1.5 kJ/kg-K, at 24° C., as measured, for example, according to ASTM E1269-11 (2018). Additionally, or in the alternative, an exemplary fiber-reinforced elastomer formulation may have an ablation temperature of from about 450° C. to about 600° C., such as from about 475° C. to about 550° C., or such as from about 500° C. to about 525 C, as measured, for example, according to ASTM E285-80 (2002). An exemplary fiber-reinforced elastomer formulation that may be included in a formulation utilized to form a fiber-reinforced elastomer layer is commercially available as MI-15® Topcoat, from Thermal Protection Products, New Orleans, LA.

Exemplary protective coatings 108 may have a thickness of from about 1.2 millimeters (mm) to about 10 mm, such as from about 2 mm to about 4 mm, such as from about 4 mm to about 6 mm, such as from about 6 mm to about 8 mm, or such as from about 8 mm to about 10 mm. The prime layer 206 may have a thickness of from about 25 micrometers (μm) to about 50 μm, such as from about 25 μm to about 40 μm, or such as from about 35 μm to about 50 μm. The silicone elastomer layer 208 may have a thickness of from about 1,000 μm to about 10,000 μm, such as from about 1,000 μm to about 4,000 μm, or such as from about 4,000 μm to about 8,000 μm, or such as from about 6,000 μm to about μm 10,000. The abrasion resistant layer 210 may have a thickness of from about 150 μm to about 500 μm, such as from about 150 μm to about 300 μm, or such as from about 250 μm to about 500 μm.

Figure 3:
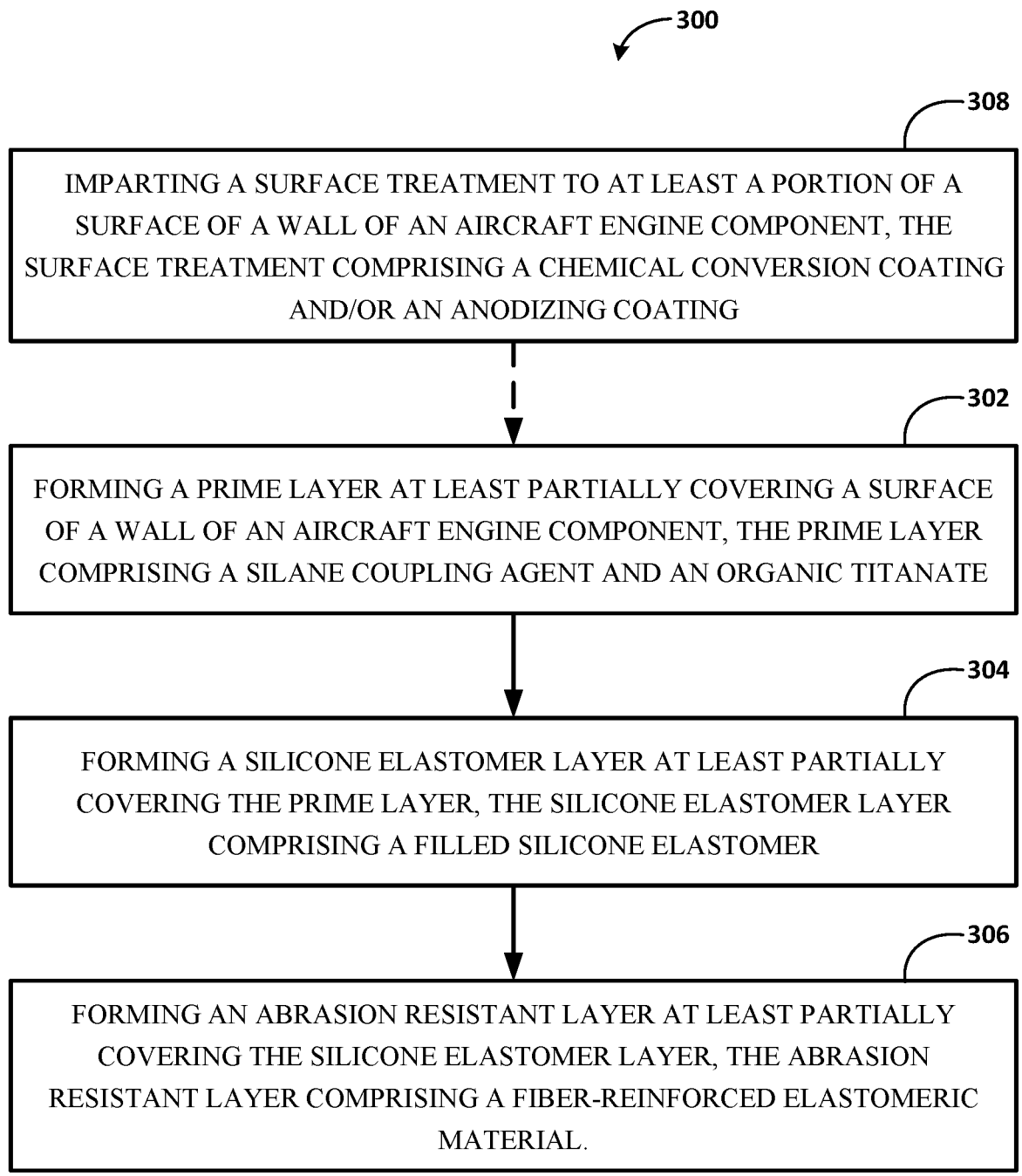
FIG. 3 shows a flow chart depicting a method of applying a protective coating to an aircraft engine component.

Referring now to FIG. 3, exemplary methods of applying a protective coating 108 (FIGS. 1 and 2) will be described. As shown, an exemplary method 300 may include, at block 302, forming a prime layer 206 (FIG. 2) at least partially covering a surface 202 (FIG. 2) of a wall 200 (FIGS. 1 and 2) of an aircraft engine component 100 (FIG. 1). The prime layer 206 may include a silane coupling agent and an organic titanate as described herein. The prime layer 206 may be applied in a light, even coat by wiping, dipping or spraying. Excess material for the prime layer 206 may be wiped off to avoid overapplication. Additional material for the prime layer 206 may be applied every 3 to 5 minutes to ensure fresh material can react with previously applied material. In some embodiments, forming the prime layer 206 may include at least partially curing the prime layer 206, preferably fully curing the prime layer 206. The prime layer 206 may be cured at room temperature, such as from about 18° C. to about 23° C., and a relative humidity of from about 30% to about 90%, such as from about 40% to about 70%. The curing time for the prime layer 206 may be from about 1 to 2 hours, and may vary depending on temperature and humidity. The curing rate of the prime layer 206 may be accelerated with moderate heat, such as at a temperature of from about 40° C. to about 60° C., or such as from about 50° C. to about 60° C.

At block 304, the exemplary method 300 may include forming the silicone elastomer layer 208 (FIG. 2) at least partially covering a surface of the prime layer 206. The silicone elastomer layer 208 may be formed using a formulation as described herein, and the formulation and may be applied by conventional spraying or rolling techniques, or the like. The silicone elastomer layer 208 may include one or more filler materials dispersed in a matrix of cross-linked silicone polymers as described herein. The silicone elastomer layer 208 may be applied in a series of sublayers. Respective sublayers of the silicone elastomer layer 208 may have a thickness of from about 100 micrometers (μm) to about 500 μm, such as from about 200 μm to about 400 μm. The number of sublayers may be determined based on the desired thickness of the silicone elastomer layer 208 and the thickness of the respective sublayers. By way of example, an exemplary silicone elastomer layer 208 may include from about 2 to about 40 sublayers, such as from about 5 to about 10 sublayers, such as from about 10 to about 20 sublayers, or from about 20 to about 40 sublayers. The sequential sublayers may be applied after solvent in the previous sublayer has flashed off but prior to fully curing. In some embodiments, application of the silicone elastomer layer 208 to the prime layer 206 may commence after the prime layer 206 has fully cured.

Forming the silicone elastomer layer 208 may include at least partially curing the silicone elastomer layer 208. For example, after the silicone elastomer layer 208 has been applied to the desired thickness, the silicone elastomer layer 208 may be at least partially cured, preferably fully cured. The silicone elastomer layer 208 may be cured at an ambient temperature of from about 20° C. to about 30° C., and a relative humidity of from about 30% to about 90%, such as from about 40% to about 70%. At an ambient temperature, the cure time may be about 24 hours. Additionally, or in the alternative, the silicone elastomer layer 208 may be cured at an elevated temperature of from about 30° C. to about 70° C., such as from about 55° C. to about 65° C. In some embodiments, the silicone elastomer layer 208 may be cured at such an elevated temperature, for example, in an oven, heated curing chamber, or the like, after initially being partially cured at an ambient temperature. For example, the silicone elastomer layer 208 may receive an ambient-temperature cure, such as for a duration of from about 2 to about 6 hours, followed by an elevated-temperature cure, such as for a duration of from about 1 to about 4 hours, or such as from about 1 to 2 hours.

At block 306, the exemplary method 300 may include forming the abrasion resistant layer 210 (FIG. 2) at least partially covering the silicone elastomer layer 208. The abrasion resistant layer 210 may be formed using a formulation as described herein, and the formulation and may be applied by conventional spraying or rolling techniques, or the like. The abrasion resistant layer 210 may include a fiber-reinforced elastomeric material as described herein. The abrasion resistant layer 210 may be applied in a series of sublayers. Respective sublayers of the abrasion resistant layer 210 may have a thickness of from about 100 micrometers (μm) to about 500 μm, such as from about 200 μm to about 400 μm. The number of sublayers may be determined based on the desired total thickness of the abrasion resistant layer 210 and the thickness of the respective sublayers. By way of example, an exemplary abrasion resistant layer 210 may include from about 2 to about 40 sublayers, such as from about 5 to about 10 sublayers, such as from about 10 to about 20 sublayers, or from about 20 to about 40 sublayers. The sequential sublayers may be applied after solvent in the previous sublayer has flashed off but prior to fully curing. In some embodiments, application of the abrasion resistant layer 210 to the silicone elastomer layer 208 may commence after the silicone elastomer layer 208 has fully cured. Additionally, or in the alternative, the abrasion resistant layer 210 may be applied to the silicone elastomer layer 208 prior to curing the silicone elastomer layer 208, such as prior to fully curing the silicone elastomer layer 208. For example, the first sublayer of the abrasion resistant layer 210 may be applied to the last sublayer of the silicone elastomer layer 208 after solvent from the silicone elastomer layer 208 has flashed off but prior to fully curing.

Forming the abrasion resistant layer 210 may include at least partially curing the abrasion resistant layer 210. For example, after the abrasion resistant layer 210 has been applied to the desired thickness, the abrasion resistant layer 210 may be at least partially cured, preferably fully cured. In some embodiments, the abrasion resistant layer 210 and the silicone elastomer layer 208 may be cured concurrently, such as when the abrasion resistant layer 210 has been applied prior to fully curing the silicone elastomer layer 208. The abrasion resistant layer 210 may be cured at an ambient temperature of from about 20° C. to about 30° C., and a relative humidity of from about 30% to about 90%, such as from about 40% to about 70%. At an ambient temperature, the cure time may be about 24 hours. Additionally, or in the alternative, the abrasion resistant layer 210 may be cured at an elevated temperature of from about 30° C. to about 70° C., such as from about 55° C. to about 65° C. In some embodiments, the abrasion resistant layer 210 may be cured at such an elevated temperature, for example, in an oven, heated curing chamber, or the like, after initially being partially cured at an ambient temperature. For example, the abrasion resistant layer 210 may receive an ambient-temperature cure, such as for a duration of from about 2 to about 6 hours, followed by an elevated-temperature cure, such as for a duration of from about 1 to about 4 hours, or such as from about 1 to 2 hours.

In some embodiments, the wall 200 of the aircraft engine component 100 may include the surface treatment 212 (FIG. 2). Additionally, or in the alternative, the exemplary method 300 may optionally include, at block 308, imparting the surface treatment 212 to at least a portion of the surface 202 of the wall 200 of the component 100. The surface treatment 212 may include a chemical conversion coating and/or an anodizing coating. The surface treatment 212 and/or the surface 202 of the wall 200 of the component 100 may be cleaned with a solvent-wetted clean cloth prior to applying the prime layer 206. The prime layer 206 may be formed in a manner that at least partially covers the surface treatment 212 imparted to the surface 202 of the wall 200 of the component 100.

The protective coating 108 may be applied to internal or external surfaces 202 of the wall 200 of the component 100. The protective coating 108 may be applied to new or refurbished components 100. In some embodiments, a pre-existing coating may be removed from the component 100 prior to applying the protective coating 108 in accordance with the present disclosure. Such a pre-existing coating may be removed with water, solvents, stripping agents, abrasives, or the like, for example, using conventional surface preparation techniques. For example, a pre-existing coating may be removed by way of high-pressure jetting of water and/or solvents, blasting with micro-abrasives, and/or soaking in a solution that includes a solvent or stripping agent.

Further aspects of the present disclosure are provided by the subject matter of the following clauses:

An aircraft engine component, comprising: a wall comprising an aluminum alloy and/or a magnesium alloy; and a protective coating at least partially covering a surface of the wall, the protective coating comprising: a prime layer at least partially covering the surface of the wall, the prime layer comprising a silane coupling agent and an organic titanate; a silicone elastomer layer at least partially covering the prime layer, the silicone elastomer layer comprising one or more filler materials dispersed in a matrix of cross-linked silicone polymers; and an abrasion resistant layer at least partially covering the silicone elastomer layer, the abrasion resistant layer comprising a fiber-reinforced elastomeric material.

The aircraft engine component of any clause herein, wherein the prime layer 206 has a thickness of from 25 micrometers to 50 micrometers.

The aircraft engine component of any clause herein, wherein the silicone elastomer layer has a thickness of from 1,000 micrometers to 10,000 micrometers.

The aircraft engine component of any clause herein, wherein the abrasion resistant layer has a thickness of from 150 micrometers to 500 micrometers.

The aircraft engine component of any clause herein, wherein the silane coupling agent comprises a trialkoxysilane, a monoalkoxysilane, and/or a dipodal silane, and wherein preferably, the silane coupling agent comprises one or more of: tetramethoxysilane, methyl silicate, tetraethyoxysilane, ethyl polysilicate, tetrapropoxysilane, tetraisopropoxysilane, tetrabutoxysilane, or tetrakisbutoxyethoxysilane.

The aircraft engine component of any clause herein, wherein the organic titanate comprises one or more of: ethyl acetoacetate titanate, di-iso-butoxy titanium, di-n-butoxy titanium, di-iso-propoxy titanium, n-Butyl polytitanate, tetra n-Butyl titanate, titanium butoxide, titanium ethylacetoacetate, or titanium tetraisopropoxide.

The aircraft engine component of any clause herein, wherein the prime layer is applied using a solution that comprises: light aliphatic naphtha in an amount of from 75 to 95 wt. %; tetrakis2-butoxyethyl orthosilicate in an amount of from 4 to 6 wt. %; and tetra n-Butyl titanate in an amount of from 4 to 6 wt. %.

The aircraft engine component of any clause herein, wherein the silicone elastomer layer comprises a one-component room-temperature-vulcanizing silicone or a two-component room-temperature-vulcanizing silicone.

The aircraft engine component of any clause herein, wherein the silicone elastomer layer comprises a silicone polymer derived from one or more polyorganosiloxanes, and wherein preferably, the one or more polyorganosiloxanes comprises: polydimethylsiloxane, polymethylhydrogensiloxane, dimethyidiphenylpolysiloxane, dimethyl/methylphenylpolysiloxane, polymethylphenylsiloxane, methylphenyl/dimethylsiloxane, vinyldimethyl terminated polydimethylsiloxane, vinylmethyl/dimethylpolysiloxane, vinyldimethyl terminated vinylmethyl/dimethylpolysiloxane, divinylmethyl terminated polydimethylsiloxane, vinylphenylmethyl terminated polydimethylsiloxane, dimethylhydro terminated polydimethylsiloxane, methylhydro/dimethylpolysiloxane, methylhydro terminated methyloctylpolysiloxane, methylhydro/phenylmethyl polysiloxane, and/or fluoro-modified polysiloxane.

The aircraft engine component of any clause herein, wherein the silicone elastomer layer comprises one or more filler materials dispersed in a matrix of cross-linked silicone polymers, and wherein preferably, the one or more filler materials comprises: glass microspheres, glass fibers, cenospheres, fumed silica, precipitated silica, silica fibers, silicon dioxide, silicon carbide, titanium dioxide, zinc oxide, rare earth minerals, silicate minerals, inosilicates, aluminum silicate, alumina trihydrate, polyepoxide microparticles, phenolic resin microspheres, ceramics, carbon fibers, carbon black, graphene, cellulosic fibers, and/or cork.

The aircraft engine component of any clause herein, wherein the silicone elastomer layer comprises one or more filler materials that have an average a cross-sectional width of from 10 nanometers to 1,000 micrometers.

The aircraft engine component of any clause herein, wherein the silicone elastomer layer comprises a total filler content of from 1 vol. % to 90 vol. %.

The aircraft engine component of any clause herein, wherein the silicone elastomer layer comprises a silanization agent, and wherein preferably, the silanization agent comprising an aminosilane, a glycidoxysilane, and/or a mercaptosilane.

The aircraft engine component of any clause herein, wherein the silicone elastomer layer has one or more of the following properties: a thermal conductivity at 38° C. of from 0.05 W/mK to 0.15 W/mK, as measured according to ASTM C177; a specific heat at 24° C. of from 1.0 kJ/kg-K to 1.6 kJ/kg-K, as measured according to ASTM E1269-11 2018; an ablation temperature of from 450° C. to 600° C., as measured according to ASTM E285-80 2002; and a heat of ablation of from 40 MJ/kg to 70 MJ/kg, with a heat exposure of 330 kJ/m$^2$-sec, at as measured according to ASTM E458-08 2020.

The aircraft engine component of any clause herein, wherein the silicone elastomer layer has one or more of the following properties: a density of from 0.2 g/cm³ to 0.6 g/cm³; and a Shore A hardness of from 30 to 80, as measured according to ASTM D2240-15e1.

The aircraft engine component of any clause herein, wherein the silicone elastomer layer comprises room-temperature-vulcanizing silicone, glass microspheres, silicone oil, fumed silica, and 3-aminopropyltriethoxysilane.

The aircraft engine component of any clause herein, wherein the silicone elastomer layer comprises one or more of: one or more silicone polymers in an amount of from 22 wt. % to 26 wt. %; silica fibers in an amount of from 1 wt. % to 5 wt. %; carbon fibers in an amount of from 1 wt. % to 5 wt. %; silica microspheres in an amount of from 30 wt. % to 40 wt. %; phenolic resin microspheres in an amount of from 4 wt. % to 8 wt. %; and cork in an amount of from 20 wt. % to 40 wt. %.

The aircraft engine component of any clause herein, wherein the fiber-reinforced elastomeric material of the abrasion resistant layer comprises one or more silicone polymers and one or more fibrous reinforcing materials, and wherein preferably, the one or more fibrous reinforcing materials comprises: glass fibers, basalt fibers, carbon fibers, ceramic fibers, aramid fibers, polycrystalline fibers, and/or polysiloxane fibers.

The aircraft engine component of any clause herein, wherein the fiber-reinforced elastomeric material of the abrasion resistant layer comprises one or thermoplastic materials, and wherein preferably, the one or more thermoplastic materials comprises one or more of the following: an acrylic, a polyamides, a polylactic acid, a polybenzimidazole, a polycarbonate; a polyether sulfone, a polyoxymethylene, a polyether ether ketone, a polyetherimide, a polyphenylene oxide, a polyphenylene sulfide, or a polytetrafluoroethylene.

The aircraft engine component of any clause herein, wherein the fiber-reinforced elastomeric material of the abrasion resistant layer comprises one or thermosetting materials, and wherein preferably, the one or more thermosetting materials comprises one or more of the following: an epoxy resin, a polyester resin, a polyurethane, or a vinyl ester resin.

The aircraft engine component of any clause herein, wherein the one or more fibrous reinforcing materials have an average length of from 1 micrometer to 10,000 micrometers; and/or wherein the one or more fibrous reinforcing materials have an average cross-sectional width of from 1 μm to 50 μm.

The aircraft engine component of any clause herein, wherein the fiber-reinforced elastomeric material comprises a total fibrous reinforcing material content of from 1 vol. % to 60 vol. %.

The aircraft engine component of any clause herein, wherein the abrasion resistant layer has one or more of the following properties: a density of from 0.9 g/cm³ to 1.4 g/cm³; and a Shore A hardness of from 40 to 90, as measured according to ASTM D2240-15e1.

The aircraft engine component of any clause herein, wherein the abrasion resistant layer has one or more of the following properties: a thermal conductivity at 38° C. of from 0.10 W/mK to 0.25 W/mK, as measured according to ASTM C177; a specific heat at 38° C. of from 0.9 kJ/kg-K to 1.5 kJ/kg-K, as measured according to ASTM E1269-11 2018; and an ablation temperature of from 450° C. to 600° C., as measured according to ASTM E285-80 2002.

The aircraft engine component of any clause herein, wherein the wall comprises a surface treatment, and wherein preferably, the surface treatment comprising a chemical conversion coating or an anodizing coating.

The aircraft engine component of any clause herein, wherein the component 100 comprises at least one of: a turbomachine casing, a combustion chamber, an exhaust duct, a bypass duct, a heat exchanger, a fuel system component, an oil system component, and a firewall.

The aircraft engine component of any clause herein, wherein the component 100 comprises at least one of: a gearbox and an oil tank.

The aircraft engine component of any clause herein, wherein the component comprises a gearbox, the gearbox comprising an epicyclic gear assembly.

A protective coating-kit for applying a protective coating to an aircraft engine component, the protective coating-kit comprising: a prime layer for at least partially covering a wall of an aircraft component, the prime layer comprising a silane coupling agent and an organic titanate; a silicone elastomer layer for at least partially covering the prime layer, the silicone elastomer layer comprising one or more filler materials dispersed in a matrix of cross-linked silicone polymers; and an abrasion resistant layer for at least partially covering the silicone elastomer layer, the abrasion resistant layer comprising a fiber-reinforced elastomeric material; wherein upon having applied the protective coating to the aircraft engine component.

The protective coating-kit of any clause herein, wherein the aircraft engine component and/or the prime layer is configured according to any clause herein.

A method of protecting an aircraft engine component from a heat source, the method comprising: applying a prime layer to a wall of an aircraft engine component, the prime layer comprising a silane coupling agent and an organic titanate; applying a silicone elastomer layer to the prime layer, the silicone elastomer layer comprising one or more filler materials dispersed in a matrix of cross-linked silicone polymers; and applying an abrasion resistant layer to the silicone elastomer layer, the abrasion resistant layer comprising a fiber-reinforced elastomeric material.

The method of any clause herein, wherein the aircraft engine component and/or the prime layer is configured according to any clause herein.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed:

1. An aircraft engine component, comprising:
    a wall comprising an aluminum alloy and/or a magnesium alloy; and
    a protective coating at least partially covering a surface of the wall, the protective coating comprising:
        a prime layer at least partially covering the surface of the wall, the prime layer comprising a silane coupling agent and an organic titanate;

a silicone elastomer layer at least partially covering the prime layer, the silicone elastomer layer comprising one or more filler materials dispersed in a matrix of cross-linked silicone polymers, wherein the silicone elastomer layer has a density of 0.2 g/cm$^3$ to 0.6 g/cm$^3$ and a Shore A hardness, when cured, of 30 to 80 according to ASTM D2240-15e1; and an abrasion resistant layer at least partially covering the silicone elastomer layer, the abrasion resistant layer comprising a fiber-reinforced elastomeric material, wherein the abrasion resistant layer has a density of 0.9 g/cm$^3$ to about 1.4 g/cm$^3$ and a Shore A hardness, when cured, of 40 to 90 according to ASTM D2240-15e1.

2. The aircraft engine component of claim 1, wherein the prime layer has a thickness of from 25 micrometers to 50 micrometers.

3. The aircraft engine component of claim 1, wherein the silicone elastomer layer has a thickness of 1,000 micrometers to 10,000 micrometers.

4. The aircraft engine component of claim 1, wherein the abrasion resistant layer has a thickness of from 150 micrometers to 500 micrometers.

5. The aircraft engine component of claim 1, wherein the silicone elastomer layer comprises one or more filler materials that have an average a cross-sectional width of 10 nanometers to 1,000 micrometers.

6. The aircraft engine component of claim 1, wherein the wall comprises a surface treatment, wherein the surface treatment comprising a chemical conversion coating or an anodizing coating.

7. The aircraft engine component of claim 1, wherein the silane coupling agent comprises at least one of: a trialkoxysilane, a monoalkoxysilane, or a dipodal silane.

8. The aircraft engine component of claim 1, wherein the organic titanate comprises at least one of: ethyl acetoacetate titanate, di-iso-butoxy titanium, di-n-butoxy titanium, di-iso-propoxy titanium, n-Butyl polytitanate, tetra n-Butyl titanate, titanium butoxide, titanium ethylacetoacetate, or titanium tetraisopropoxide.

9. The aircraft engine component of claim 1, wherein the prime layer is applied using a solution that comprises: light aliphatic naphtha in an amount of 75 to 95 wt. %; tetrakis2-butoxyethyl orthosilicate in an amount of 4 to 6 wt. %; and tetra n-Butyl titanate in an amount of 4 to 6 wt. %.

10. The aircraft engine component of claim 1, wherein the silicone elastomer layer comprises a silicone polymer derived from one or more polyorganosiloxanes.

11. The aircraft engine component of claim 1, wherein the one or more filler materials comprises at least one of: glass microspheres, glass fibers, cenospheres, fumed silica, precipitated silica, silica fibers, silicon dioxide, silicon carbide, titanium dioxide, zinc oxide, rare earth minerals, silicate minerals, inosilicates, aluminum silicate, alumina trihydrate, polyepoxide microparticles, phenolic resin microspheres, ceramics, carbon fibers, carbon black, graphene, cellulosic fibers, or cork.

12. The aircraft engine component of claim 1, wherein the silicone elastomer layer comprises a silanization agent.

13. The aircraft engine component of claim 12, wherein the silanization agent comprises at least one of: an aminosilane, a glycidoxysilane, or a mercaptosilane.

14. The aircraft engine component of claim 1, wherein the fiber-reinforced elastomeric material of the abrasion resistant layer comprises one or more silicone polymers and one or more fibrous reinforcing materials.

15. The aircraft engine component of claim 14, wherein the one or more fibrous reinforcing materials have an average length of 1 micrometer to 10,000 micrometers.

16. The aircraft engine component of claim 14, wherein the one or more fibrous reinforcing materials have an average cross-sectional width of 1 µm to 50 µm.

17. The aircraft engine component of claim 14, wherein the one or more fibrous reinforcing materials comprises at least one of: glass fibers, basalt fibers, carbon fibers, ceramic fibers, aramid fibers, polycrystalline fibers, or polysiloxane fibers.

18. The aircraft engine component of claim 1, wherein the fiber-reinforced elastomeric material of the abrasion resistant layer comprises at least one of: one or thermoplastic materials or one or thermosetting materials.

* * * * *